US006757351B1

(12) United States Patent
Gou et al.

(10) Patent No.: US 6,757,351 B1
(45) Date of Patent: Jun. 29, 2004

(54) MODIFIED LARGE NATURAL CIRCULATION REACTOR

(75) Inventors: Perng-Fei Gou, Saratoga, CA (US); Craig D. Sawyer, Los Gatos, CA (US); Larry E. Fennern, San Jose, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/232,897

(22) Filed: Jan. 15, 1999

Related U.S. Application Data

(60) Provisional application No. 60/075,989, filed on Feb. 25, 1998.

(51) Int. Cl.[7] .............................................. G21C 13/093

(52) U.S. Cl. ....................... 376/294; 376/293; 376/295; 376/296

(58) Field of Search .................................. 376/293–296

(56) References Cited

U.S. PATENT DOCUMENTS 2,773,459 A * 12/1956 Sechy ......................... 109/82
3,151,416 A * 10/1964 Eakin et al. .................. 50/532
3,454,080 A * 7/1969 Kunzil ........................ 165/47
3,656,231 A * 4/1972 Sheldon et al. ............... 29/624
3,816,246 A * 6/1974 Kumpf ........................ 176/65
3,907,151 A * 9/1975 Gilden ..................... 220/63 R
4,011,132 A * 3/1977 Kumpf et al. ................ 176/38
4,035,974 A * 7/1977 Kumpf ........................ 52/249
4,061,534 A * 12/1977 Jackson ...................... 176/37
4,100,115 A * 7/1978 Baer .......................... 521/83
4,797,159 A * 1/1989 Spangle ....................... 106/89
5,234,754 A * 8/1993 Bache ........................ 428/332
5,961,712 A * 10/1999 Sun et al. ................... 106/696

FOREIGN PATENT DOCUMENTS

DE 3420462 * 12/1985
HU 19477 * 2/1981
HU 53350 * 10/1990

* cited by examiner

*Primary Examiner*—Jack Keith
(74) *Attorney, Agent, or Firm*—Armstrong Teasdale LLP

(57) ABSTRACT

The present invention, in one form, is a natural circulation reactor having, in one embodiment, a layer of high aluminate cement concrete disposed between an uninsulated steel liner and a prestressed concrete reactor vessel. The prestressed concrete reactor vessel includes a concrete shell having a cavity therein. The steel liner is positioned in the cavity and spaced from the concrete shell so that an insulating chamber is formed between the steel liner and the concrete shell. The insulating chamber is filled with high aluminate cement concrete which is configured to substantially insulate the concrete shell from the steel liner and to transfer loads such as pressure from the liner to the concrete shell.

12 Claims, 2 Drawing Sheets

54
56
40
52
50
58
60
46
44
68
64
66
42
62
48

MODIFIED LARGE NATURAL CIRCULATION REACTOR

CROSS-REFERENCE TO RELATED APPLICATIONS

This application claims the benefit of U.S. Provisional Application No. 60/075,989, filed Feb. 25, 1998.

BACKGROUND OF THE INVENTION

This invention relates generally to nuclear reactors and, more particularly, to prestressed concrete reactor pressure vessels of large natural circulation reactor.

A large natural circulation reactor (NCR) typically includes a reactor core located within a prestressed concrete reactor vessel (PCRV). A known PCRV includes a substantially cylindrical concrete shell which is closed at its top end by a top head. The top head is removable so that components, e.g., steam dryers and fuel bundles, located in the PCRV can be accessed. An inside surface of the PCRV is lined with a steel liner to facilitate keeping the PCRV leak-tight.

During PCRV operation, heat generated within the core is transmitted through the steel liner and into the concrete PCRV shell. The exterior surface of the PCRV is exposed to an ambient atmospheric temperature. If the concrete shell becomes too hot, it is possible that cracks may develop in the concrete shell because of the temperature gradient.

In the past, a reactor wall cooling system and an insulation layer have been utilized to cool the concrete PCRV shell, e.g., below 150 degrees Fahrenheit. The insulation layer is positioned adjacent to an inner surface of the steel liner and substantially insulates the liner, and thus the PCRV shell, from heat generated by the core. The reactor wall cooling system transports cooling fluid, e.g., water, throughout the PCRV shell to facilitate cooling the PCRV shell. Particularly, the reactor wall cooling system includes several cooling pipes, motors, pumps, valves and heat exchangers. The cooling pipes extend through the concrete shell adjacent the liner, and the motors, pumps, valves and heat exchangers facilitate transporting the cooling fluid through the shell to disperse heat within the concrete shell.

Installing the reactor wall cooling system and insulation layer are time consuming and tedious. In the PCRV, the vessel shell has numerous prestressing tendons. They may interfere with the cooling pipes. To assure the integrity of the steel liner throughout the life of the PCRV, it is desirable to periodically inspect the steel liner and its welds. However, the insulation on the inner face of the liner makes any inspection of the liner difficult. In addition, over the life of the reactor, it is possible that the pipes of the reactor wall cooling system may develop leaks. Since the pipes of the reactor wall cooling system are embedded in the concrete shell, it typically is difficult and time consuming to isolate and repair any such leaks.

Accordingly, it would be desirable to substantially insulate the PCRV shell from heat generated by the core without insulating the inner surface of the steel liner. It also would be desirable to maintain the PCRV shell at a cool temperature without requiring a reactor wall cooling system.

SUMMARY OF THE INVENTION

These and other objects may be attained by a natural circulation reactor having a layer of high aluminate cement concrete disposed between an uninsulated steel liner and the inner surface of the PCRV concrete shell. Instead of aluminate cement concrete, heat resistant concrete or refractory castable concrete can be used. Particularly, the steel liner is spaced from the inside surface of the PCRV concrete shell to define an insulating chamber between the steel liner and the PCRV inner surface. The insulating chamber is filled with high aluminate cement concrete which is configured to substantially insulate the concrete shell from the steel liner and to transfer loads such as pressure from the liner to the concrete shell.

The PCRV shell of the above described reactor is substantially insulated from heat generated by the reactor core without the inner surface of the steel liner being insulated. Such shell also is maintained at a cool temperature without requiring a reactor wall cooling system.

DETAILED DESCRIPTION OF THE INVENTION

Figure 1:
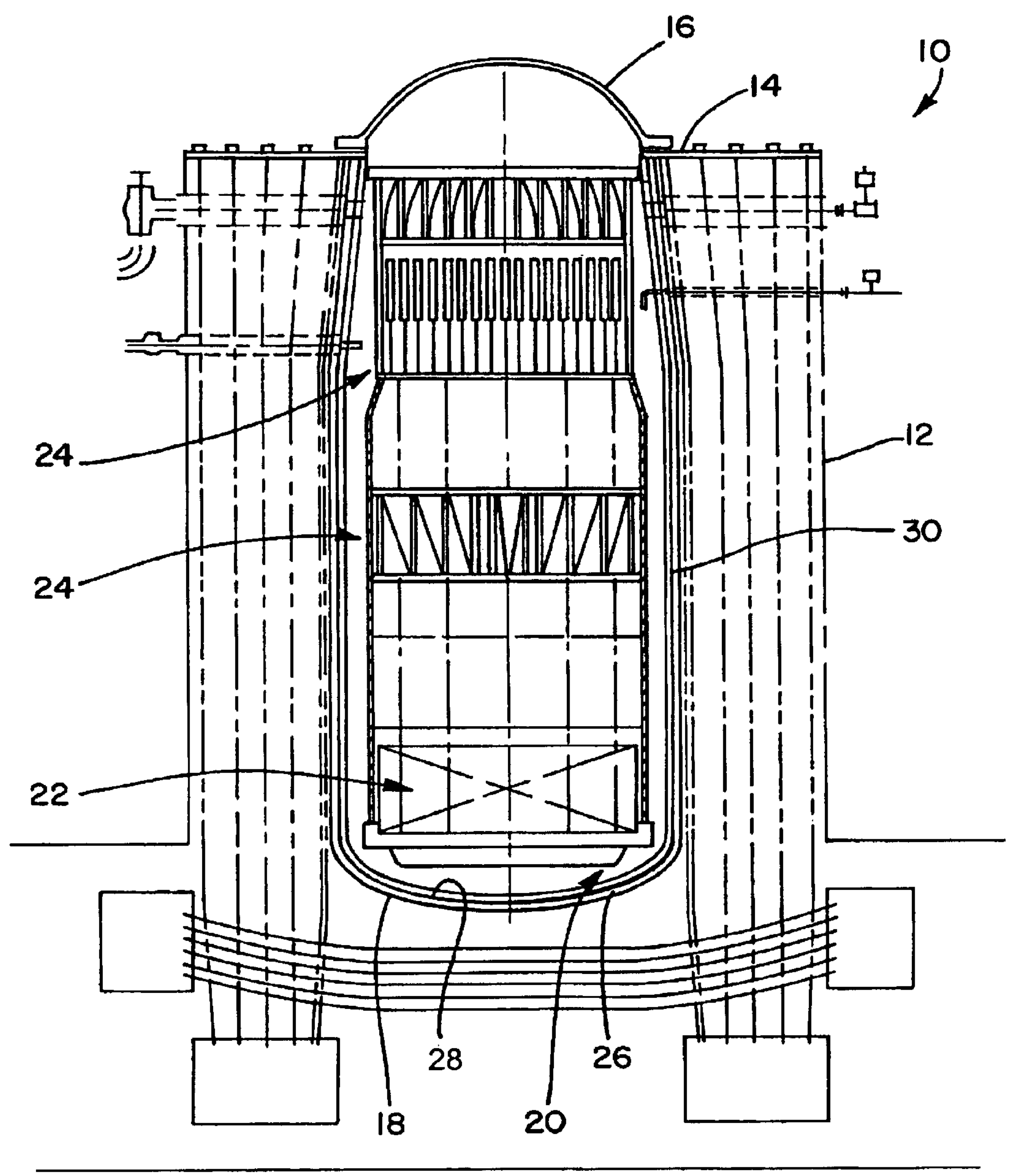
FIG. 1 is a schematic, partial cross-sectional, illustration of a known prestressed concrete reactor vessel for a natural circulation reactor.

FIG. 1 is a schematic, partial cross-sectional, illustration of a known prestressed concrete reactor vessel (PCRV) 10 for a natural circulation reactor (NCR). PCRV 10 has a concrete shell 12 which is closed at its top end 14 by a removable top head 16. Concrete shell 12 includes a substantially cylindrical inside surface 18 defining a PCRV chamber 20. A reactor core 22 and other reactor components 24 are located in PCRV chamber 20.

In the past, an insulated steel liner 26 and a reactor wall cooling system (not shown in FIG. 1) are utilized in connection with PCRV 10. Particularly, inside surface 18 of PCRV 10 is lined with steel liner 26 to facilitate keeping PCRV 10 leak-tight, and an inside surface 28 of steel liner 26 is lined with a layer of insulation 30 to substantially insulate steel liner 26 from heat generated by core 22 during reactor operation. The reactor wall cooling system for cooling concrete shell 12 is configured to transport cooling fluid, e.g., water, throughout PCRV shell 12 and includes several cooling pipes embedded in concrete shell 12. The pipes extend through shell 12 adjacent steel liner 26 and are coupled to motors, pumps, valves and heat exchangers which cooperate to transport the cooling fluid through shell 12 and disperse heat within concrete shell 12.

As explained above, installing the reactor wall cooling system in reactor concrete shell 12 is time consuming and tedious. In addition, and because the cooling system pipes are embedded in the concrete, inspecting and repairing the cooling system pipes is difficult. Moreover, inspecting and repairing steel liner 26 is difficult because of insulation layer 30.

Figure 2:
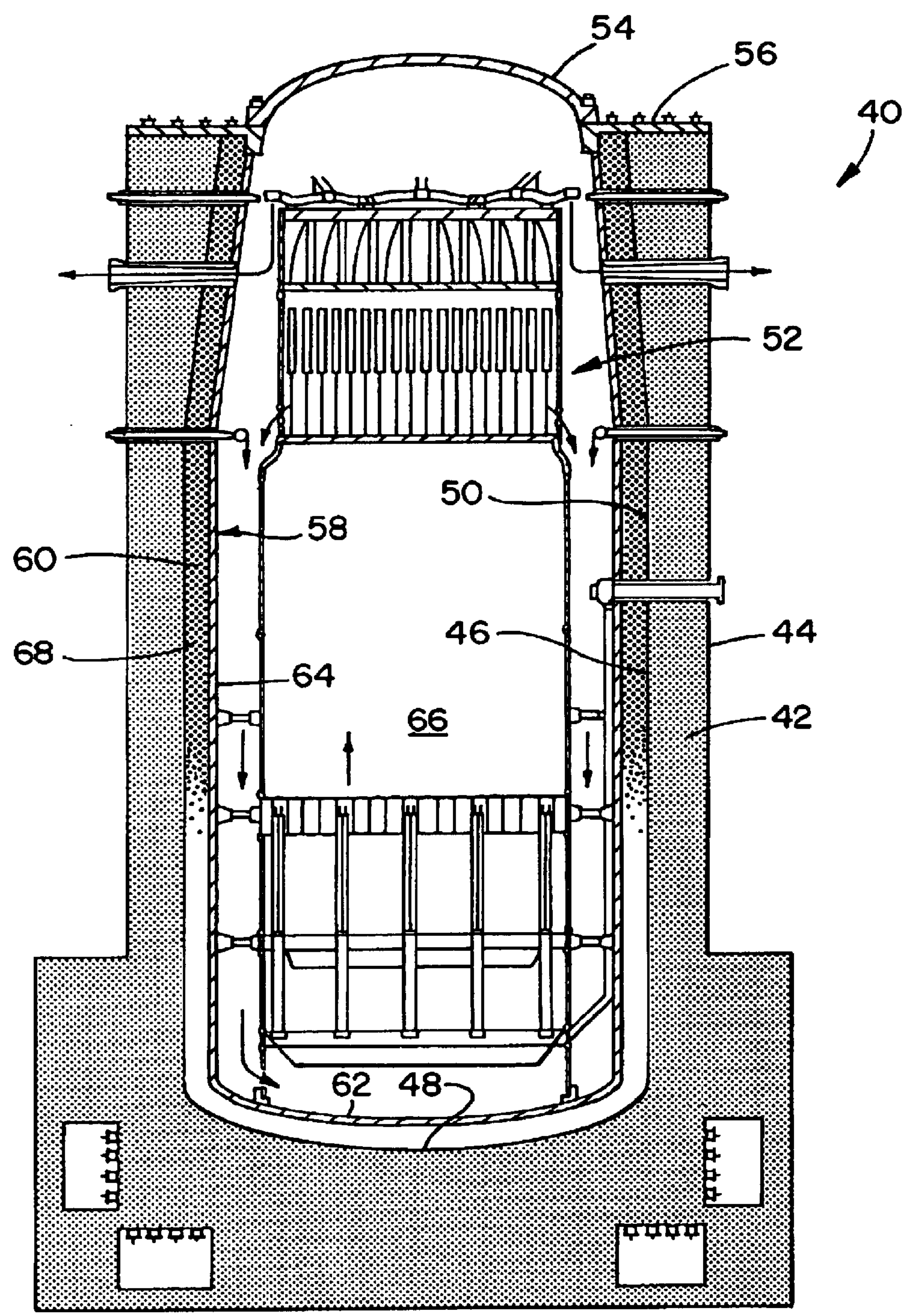
FIG. 2 is a schematic, partial cross-sectional, illustration of a prestressed concrete reactor vessel for a natural circulation reactor in accordance with one embodiment of the present invention.

FIG. 2 is a schematic, partial cross-section, illustration of a prestressed concrete reactor vessel (PCRV) 40 for a natural circulation reactor in accordance with one embodiment of the present invention. PCRV 40 includes a concrete shell 42 having an outer surface 44 and an inner surface 46. A bottom head 48 and a substantially cylindrical side wall 50 define a PCRV chamber 52. A removable top head 54 is coupled to a top end 56 of concrete shell 42 and is configured to close, or seal, vessel chamber 52.

An uninsulated steel liner 58 is positioned within vessel chamber 52 and is spaced from PCRV inner surface 46 to define an insulating chamber 60 between steel liner 58 and PCRV inner surface 46. Particularly, steel liner 58 includes a bottom wall 62 and a substantially cylindrical side wall 64 extending therefrom to define a core receiving chamber 66 sized to receive reactor components such as steam separators and the core. Steel liner 58 is positioned coaxially within PCRV chamber 52 so that steel liner bottom wall 62 is spaced from bottom head 48 and steel liner side wall 64 is spaced from PCRV inner surface side wall 50.

A layer of insulating material 68 is positioned between steel liner 58 and PCRV inner surface 46 to substantially insulate concrete shell 42 from heat generated within the reactor core. Particularly, insulating chamber 60 is substantially filled with insulating material 68 so that insulating material 68 extends between PCRV side wall 50 and steel liner side wall 64, and between PCRV bottom head 48 and steel liner bottom wall 62.

Insulating material 68 transfers loads from steel liner 58 to concrete shell 42. Particularly, insulating material 68 transfers internal loads, e.g., pressure, from steel liner 58 to concrete shell 42. In addition, insulating material 68 substantially insulates concrete shell 42 from heat generated by the reactor core. Insulating material 68 may, for example, be a High Aluminate Cement Concrete (HACC). Alternatively, insulating pressure material 68 may be fabricated from fire bricks or fire brick variations, or heat resistant concrete, or refractory castable concrete.

The concrete shell of the above described reactor is substantially insulated from heat generated by the reactor core without the inner surface of the steel liner being insulated. Such shell also is maintained at a cool temperature without requiring a reactor wall cooling system. In addition, the uninsulated steel liner of the above described reactor is believed to be easier to inspect than steel liners in known large circulation nuclear reactors.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A natural circulation reactor comprising:

a prestressed concrete reactor vessel having an inner concrete surface defining a vessel chamber, said inner concrete surface having a surface area;

a steel liner positioned within said vessel chamber and spaced from said prestressed concrete reactor vessel inner concrete surface;

an insulating chamber defined by an outer surface of said liner and said inner concrete surface of said prestressed concrete reactor vessel, said outer surface of said liner having a surface area; and insulating material positioned in and substantially filling said insulating chamber, said insulating material extending from said inner concrete surface of said prestressed concrete reactor vessel to said outer surface of said steel liner, said insulating material in intimate contact with substantially all of said surface area of said inner concrete surface of said prestressed concrete reactor vessel and with substantially all of said surface area of said outer surface of said steel liner.

2. A natural circulation reactor in accordance with claim 1 wherein said insulating material is fabricated from High Aluminate Cement Concrete.

3. A natural circulation reactor in accordance with claim 1 wherein said insulating material is fabricated from heat resistant concrete, refractory castable concrete, or fire bricks.

4. A natural circulation reactor in accordance with claim 1 wherein an inner surface of said steel liner is not insulated.

5. A natural circulation reactor in accordance with claim 1 further comprising an insulating chamber extending between said steel liner and said prestressed concrete reactor vessel inner surface, and wherein said insulating chamber is at least partially filled with High Aluminate Cement Concrete.

6. A natural circulation reactor in accordance with claim 1 further comprising an insulating chamber extending between said steel liner and said prestressed concrete reactor vessel inner surface, and wherein said insulating chamber is at least partially filled with fire bricks, heat resistant concrete, or refractory castable concrete.

7. A natural circulation reactor in accordance with claim 1 wherein said steel liner is substantially coaxially aligned within said vessel chamber.

8. A prestressed concrete reactor vessel for a nuclear reactor, said prestressed concrete reactor vessel comprising:

a prestressed concrete shell having an inner concrete surface defining a vessel chamber therein, said inner concrete surface having a surface area;

a steel liner positioned within said vessel chamber and spaced from said shell inner concrete surface;

an insulating chamber defined by an outer surface of said steel liner and said inner concrete surface of said prestressed concrete shell, said outer surface of said steel liner having a surface area; and insulating material positioned in and substantially filling said insulating chamber, said insulating material extending from said inner concrete surface of said shell to said outer surface of said steel liner, said insulating material in intimate contact with substantially all of said surface area of said inner concrete surface of said prestressed concrete shell and with substantially all of said surface area of said outer surface of said steel liner.

9. A prestressed concrete reactor vessel in accordance with claim 8 wherein said insulating material comprises High Aluminate Cement Concrete.

10. A prestressed concrete reactor vessel in accordance with claim 8 wherein said insulating material comprises fire bricks, heat resistant concrete, or refractory castable concrete.

11. A prestressed concrete reactor vessel in accordance with claim 8 wherein an inner surface of said steel liner is not insulated.

12. A prestressed concrete reactor vessel in accordance with claim 8 wherein said steel liner is substantially coaxially aligned within said vessel chamber.

* * * * *